(12) United States Patent
Bioul et al.

(10) Patent No.: US 11,214,509 B2
(45) Date of Patent: Jan. 4, 2022

(54) GLASS SHEET HAVING EDGES WHICH ARE ACHROMATIC AND LUMINOUS

(71) Applicant: AGC GLASS EUROPE, Louvain-la-Neuve (BE)

(72) Inventors: Francois Bioul, Thorembais-Saint-Trond (BE); Aline Degand, Bleret (BE); Francois Boland, Gemboux (BE)

(73) Assignee: AGC GLASS EUROPE, Louvain-la-Neuve (BE)

( * ) Notice: Subject to any disclaimer, the term of this patent is extended or adjusted under 35 U.S.C. 154(b) by 5 days.

(21) Appl. No.: 16/469,932

(22) PCT Filed: Dec. 14, 2017

(86) PCT No.: PCT/EP2017/082753
§ 371 (c)(1),
(2) Date: Jun. 14, 2019

(87) PCT Pub. No.: WO2018/114566
PCT Pub. Date: Jun. 28, 2018

(65) Prior Publication Data
US 2020/0079681 A1    Mar. 12, 2020

(30) Foreign Application Priority Data

Dec. 19, 2016 (EP) .................................... 16205112
Dec. 20, 2016 (EP) .................................... 16205414

(51) Int. Cl.
*C03C 3/095* (2006.01)
*C03C 4/00* (2006.01)

(52) U.S. Cl.
CPC ............ *C03C 3/095* (2013.01); *C03C 4/0092* (2013.01); *C03C 2204/00* (2013.01)

(58) Field of Classification Search
CPC ........... C03C 4/02; C03C 3/095; C03C 3/045; C03C 3/068; C03C 4/0092; C03C 2204/00
See application file for complete search history.

(56) References Cited

U.S. PATENT DOCUMENTS

| 7,037,869 B2 * | 5/2006 | Landa ..................... C03C 3/095 501/64 |
| 2002/0169064 A1 | 11/2002 | Nagashima |
| 2004/0209757 A1 | 10/2004 | Landa et al. |

FOREIGN PATENT DOCUMENTS

WO    WO 2016/202605 A1    12/2016

OTHER PUBLICATIONS

International Search Report dated May 9, 2018 in PCT/EP2017/082753 filed Dec. 14, 2017.

* cited by examiner

*Primary Examiner* — Karl E Group
*Assistant Examiner* — Cameron K Miller
(74) *Attorney, Agent, or Firm* — Oblon, McClelland, Maier & Neustadt, L.L.P.

(57) ABSTRACT

A glass sheet having a composition comprising the following in weight percentage, expressed with respect to the total weight of glass:
Total iron (expressed as $Fe_2O_3$) 20-750 ppm;
Selenium (expressed as Se) 0.1-<3 ppm;
Cobalt (expressed as Co) 0.05-5 ppm; and
a ratio $Er_2O_3/Fe_2O_3$ 0.1-1.5.
Such a glass sheet has a high luminous transmittance and shows edges which are colorless/achromatic and very luminous/bright, while maximizing the luminous transmittance. The glass sheet is particularly suitable due to its aesthetics as building glass or interior glass.

20 Claims, No Drawings

GLASS SHEET HAVING EDGES WHICH ARE ACHROMATIC AND LUMINOUS

1. TECHNICAL FIELD OF THE INVENTION

The present invention relates to a high luminous transmittance glass sheet having edges which are neutral/achromatic as well as luminous/bright.

This invention is particularly suitable due to its aesthetics as building glass or interior glass, like for example in furniture applications but also in other applications like in automotive or display fields.

2. DESCRIPTION OF THE PRIOR ART

In the art, "ultra-white" or "extra-clear" glasses are known since years in the solar or building domain, due to their high luminous and/or energetical transmittance. These glasses contain low amount of iron and are thereby also often called "low-iron glasses".

Iron exists in the glass in the form of ferric ions $Fe^{3+}$ and ferrous ions $Fe^{2+}$. The presence of ferric ions gives to the glass a slight absorption of visible light of short wavelength and a higher absorption in the near ultraviolet (absorption band centered on 380 nm), while the presence of ferrous ions (sometimes expressed as FeO oxide) causes a strong absorption in the near infrared (absorption band centered on 1050 nm). Ferric ions provide a light yellow coloration while ferrous ions give a pronounced blue-green color. Thus, the increase of the total iron content (both forms) enhances the absorption in the visible, to the detriment of light transmission.

Solar quality low-iron glasses comprise typically total iron in an amount less than 0.04 wt % or even 0.02 wt % expressed as $Fe_2O_3$. Those glasses have typically very high luminous transmittance (generally evaluated through the thickness) and their edges are also very bright, luminous (or, in other words, the sheet has a high "edge luminosity"). Next to that, it is known that, even if such glasses in the form of a sheet can be qualified as colorless when looking through their main faces, their edges appear to be significantly colored (because of elongated view path). When considering classical low-iron solar glass sheets, like for example Sunmax® glass from the Company AGC Glass Europe, one can observe, irrespective of the sheet thickness, a greenish-yellowish tint of the glass edges which is more or less pronounced depending on the sheet size (and thus the view path).

Even if colored glass edges are acceptable for many applications (like for solar applications), there are frequently aesthetic issues with a green/yellow hue, particularly if:

the edge color has to be compatible with the decor of the room or with the other portions of the furniture of which the glass is a part; or if the glass is arranged directly adjacent to objects of different colors, for example in articles of furniture; or when the glass sheets, such as for example table tops, are arranged such that their edges are in the direct field of view of an observer.

To solve these essentially aesthetical issues, one known solution to avoid the coloration of the edges of extra-clear glass is to further decrease the total iron content in the composition of the glass sheet. However, this solution increases drastically the resulting glass cost because a very low iron content requires very pure starting materials and/or also their purification. Moreover, it is limited to a minimum level of iron for processing reasons (furnace wear highly accelerated, quality issues, yield loss, higher consumption during low-iron production).

Next to that, it has been also proposed to avoid the undesired green/yellow tint of the edges of classical extra-clear glass sheets by producing a more pleasing color (for example an azure/blue tint) that dominates over the initial green/yellow color.

To give edges with an optimized/desirable color in low-iron glass sheets, several solutions have been described:

EP0463607 B1 suggests, in addition to minimizing the iron content in the glass to less than 0.02 weight % $Fe_2O_3$ (total iron content), that the redox ratio should be increased (that-is-to-say increase the amount of ferrous ions $Fe^{2+}$) and in particular, adjusted it to at least 0.44, in order to have edges with an azure tint. However, such redox values are not straightforward to reach in conventional flat glass furnaces and under the usual melting conditions for the production of sulfate-refined soda-lime-silicate glass. It is possible to achieve such high redox values only by using special, very costly additional glass raw materials and with suitable modification of the melting process. Moreover, such a solution gives glass sheets with bluish-greenish edges.

EP0463606 B1 teaches, with low iron content of less than 0.02 weight % $Fe_2O_3$ (total iron content), that selenium can be added in very low amounts (0.3-2 ppm) in order to obtain a honey-colored edges of a glass sheet to match/harmonize notably with wood furniture. Cobalt can optionally be added, if desired, in an amount up to 3 ppm (CoO) to render edges more neutral but only approaching grey/wood/honey tones.

US6218323B1 also proposes to give a blue tint to edges of a glass sheet by incorporating cobalt in the range 0.1-1 ppm (as CoO) in a soda-lime-silicate matrix with total iron below 0.03 wt % (as $Fe_2O_3$). The resulting glass sheet shows a redox below 0.4 and a high luminous transmittance through the thickness of at least 89% (TLD4). Such disclosed compositions give (i) coloured blue edges for glass sheets with a length up to 50 cm and (ii) edges with a colour tending to become green when sheet length reaches for example~1 m.

Other solutions to obtain a glass sheet with blue edges resides in the addition, instead of cobalt, of neodymium and/or erbium. Erbium-comprising clear glasses are known for example from WO2005082799A2 disclosing compositions with total iron (expressed as $Fe_2O_3$): 0.01 to 0.30 wt % and erbium oxide (expressed as $Er_2O_3$): 0.01 to 0.30 wt %. Neodymium-comprising glasses are known for example from US2004043886A1 disclosing compositions with neodymium oxide (expressed as $Nd_2O_3$): 0.001 to 0.1 wt %. Advantageously, the addition of erbium or neodymium allows reaching higher luminous transmittance. Unfortunately, such disclosed compositions have non-neutral yellow/green-coloured edges. Moreover, the addition of erbium and/or neodymium lead to a significant additional cost of the glass due to expensiveness of erbium, neodymium raw materials.

Patent application EP15172778.1 proposes a glass sheet with a composition comprising 0.002-0.15 wt % Fe2O3, 0.0003-0.005 wt % Se and 0.00005-0.0015 wt % Co. Those glass sheets show edges with very neutral color. Nevertheless, the addition of Se (and Co) in such amounts in the glass matrix decreases slightly the luminous transmittance which is relatively acceptable when looking through the thickness but which is problematic when looking through the edges. Indeed, "edge luminosity" is decreased a lot in those glass sheets, especially when the size of the sheet is large (meaning an elongated view path through the edges, giving a more or less pronounced dark neutral grey color to the edges).

Hence, the state-of-the art presently only proposes:

(i) high luminous transmittance glass sheets having edges with a more pleasant non-neutral color (i.e. blue or green/yellow-toned); or (ii) high luminous transmittance glass sheets having very neutral edges but with a decreased luminosity (the edges then appearing more and more dark/dusky when the sheet size is increasing, due to increasing view path).

Therefore, the state of the art does not provide any solution to reach a glass sheet having at the same time edges which (i) are neutral and (ii) which are luminous/bright, while maximizing the luminous transmittance.

Though, this is of great interest in building or interior domain to have such kind of glass, in extra-clear/low-iron or even in clear/mid-iron version, with no significant visible color from the main faces as well as from the edges and with very bright edges even for very large sheet size (comparable to edge luminosity of a solar quality low-iron glass). Indeed, such a glass sheet would be totally neutral aesthetically and thus would not alter the global aesthetic/color rendering and is usable easily in/with any object/element (furniture, building, paint, coating . . . ) irrespective of its color. Indeed, in such an eventuality, there would be no need anymore to search for color matching between edges of glass sheets and the object integrating it or associated with it.

The neutrality/achromaticity of a glass sheet/edge is generally evaluated by its vicinity to the illuminant (0;0 coordinate in a*b* system).

The "edge luminosity" of a glass sheet roughly corresponds to the amount of visible light arriving to said edge starting from the opposite edge (elongated view path equal to the length of the sheet). When looking the glass sheet through one of its edge, the more visible light comes to said edge the more bright it will appear.

3. OBJECTIVES OF THE INVENTION

The present invention has notably the objective of overcoming the cited drawbacks of the prior art.

More precisely, one objective of the invention is to provide a glass sheet having a high luminous transmittance and having edges which are colorless/achromatic and luminous/bright, even for a large sheet size, while maximizing the luminous transmittance.

Another objective of the invention is to supply a solution to the disadvantages of the prior art that is simple and economical.

4. DETAILED DESCRIPTION OF THE INVENTION

The invention relates to a glass sheet having a composition comprising the following:

| | |
|---|---|
| Total iron (expressed as $Fe_2O_3$) | 20-750 ppm; |
| Selenium (expressed as Se) | 0.1-<3 ppm; |
| Cobalt (expressed as Co) | 0.05-5 ppm; and |
| a ratio $Er_2O_3/Fe_2O_3$ | 0.1-1.5. |

Hence, the invention lies on a novel and inventive approach since it enables to find a solution for the disadvantages of prior art. The inventors have indeed found that, surprisingly, combining cobalt, selenium and erbium in a low/mid-iron glass matrix (total iron from 20 to 750 ppm) in specific amounts, allows to reach a glass sheet having edges which are colorless/achromatic and highly luminous/bright, even for a large sheet size, while maximizing luminous transmittance (reducing at maximum the loss compared to low/mid-iron glass sheet without cobalt, selenium and erbium).

In present description and claims, to quantify the luminous transmittance of a glass sheet, one considers the total light transmission with illuminant D65 (TLD) for a sheet thickness of 4 mm (TLD4) at a solid angle of observation of 2° (according to standard ISO9050). The light transmission represents the percentage of light flux emitted between wavelengths 380 nm and 780 nm which is transmitted through the glass sheet.

In present description and claims, to evaluate the absence of color or the degree of neutrality/achromaticity of a glass sheet (or "sheet neutrality"), one considers CIELab values: a* and b* for a sheet thickness of 4 mm, in transmission with illuminant D65, 10°, SCI. More precisely, in present description and claims, the neutrality of a glass sheet is evaluated through its vicinity to the illuminant (0;0 coordinate in a*b* system) and in particular, it is quantified by "$N_{4mm}$" defined as:

$N_{4mm} = \sqrt{a^{*2}+b^{*2}}$, which has to be lowered as much as possible to go towards sheet neutrality.

In order to characterize the aesthetics of the edges of a glass sheet, classical optical properties (luminous transmittance and a*b* parameters) given at 4 mm thickness are not relevant, because light travels a much longer optical path before reaching the glass edges.

Therefore, in present description and claims, to evaluate the absence of color or the degree of neutrality/achromaticity of an edge of a glass sheet (or "edge neutrality"), one considers CIELab values: a* and b* for an optical path of 500 mm, in transmission with illuminant D65, 10°, SCI. More precisely, in present description and claims, the neutrality of an edge of a glass sheet is evaluated through its vicinity to the illuminant (0;0 coordinate in a*b* system) and in particular, it is quantified by "$N_{500mm}$" defined as:

$N_{500mm} = \sqrt{a^{*2}+b^{*2}}$, which has to be lowered as much as possible to go towards edge neutrality.

In present description and claims also, to evaluate the "edge luminosity", one considers the "half-absorption length" (HAL) corresponding to the length of glass/optical path at which the visible light running through the glass is absorbed by half. This gives a good evaluation of the extinction degree of visible light travelling from edge to edge and thus of the luminous appearance of edges of the glass sheet (more or less bright or dark).

Other features and advantages of the invention will be made clearer from reading the following description of preferred embodiments and figures, given by way of simple illustrative and non-restrictive examples.

Throughout the present text, when a range is indicated, the extremities are included, except if explicitly described in another way. In addition, all the integral and subdomain values in the numerical range are expressly included as if explicitly written. Also, throughout the present text, the values of content are in percentage by weight expressed with respect to the total weight of the glass (also mentioned as wt %), except if explicitly described in another way (i.e. in ppm). Moreover, when a glass composition is given, this relates to the bulk composition of the glass.

The glass sheet according to the invention may have varied and relatively large sizes. It can, for example, have sizes ranging up to 3.21 m×6 m or 3.21 m×5.50 m or 3.21 m×5.10 m or 3.21 m×4.50 m ("PLF" glass sheet) or also, for example, 3.21 m×2.55 m or 3.21 m×2.25 m ("DLF" glass sheet). The glass sheet according to the invention may have varied thickness of from 0.1 to 25 mm.

According to the invention, the composition of the invention comprises total iron (expressed in terms of $Fe_2O_3$) as follows: 20-750 ppm. In present description, when talking about total iron content in glass composition, "total iron" and "$Fe_2O_3$" are used as well. The minimum value of 20 ppm makes it possible not to excessively damage the cost of the glass as such low iron values often require expensive, very pure starting materials and/or their purification. According to an embodiment, the composition comprises total iron as follows: 20-600 ppm. Preferably, the composition comprises total iron as follows: 20-400 ppm. More preferably, the composition comprises total iron as follows: 20-300 ppm. In a very preferred embodiment, the composition comprises total iron as follows: 20-200 ppm or even, 20-150 ppm. In the most preferred embodiment, the composition comprises total iron as follows: 20-125 ppm. The decreasing of maximum value in total iron allows to reach higher and higher values of luminous transmittance.

According to the embodiment of the invention, the glass sheet has a TLD4 higher than 82%, 85%, 87%, 88%, 89%, 89.5% or even higher than 90%, or better higher than 90.5%, 90.75% or even more better higher than 91%.

According to an embodiment, the glass sheet is characterized by: $N_{4mm} \leq 0.25$; $\leq 0.20$; $\leq 0.15$; $\leq 0.10$. These embodiments allow to approach more and more the sheet neutrality.

According to another embodiment, the glass sheet is characterized by: $N_{500mm} \leq 15$; $\leq 12$; $\leq 10$; $\leq 8$; $\leq 5$; $\leq 3$. These embodiments allow to approach more and more the edge neutrality.

According to the invention, the composition of the invention comprises a ratio $Er_2O_3/Fe_2O_3$ as follows: 0.1-1.5.

Preferably, the composition comprises a ratio $Er_2O_3/Fe_2O_3 \leq 1.3$ or better, $\leq 1.25$. This decreased maximum value allows to decrease costs of the glass (due to expensiveness of erbium) while still achieving the objectives.

Preferably also, the composition comprises a ratio $Er_2O_3/Fe_2O_3 \geq 0.2$ or better, $\geq 0.3$. More preferably, the composition comprises a ratio $Er_2O_3/Fe_2O_3 \geq 0.4$ or better, $\geq 0.5$. In a very preferred mode, the composition comprises a ratio $Er_2O_3/Fe_2O_3 \geq 0.7$ or even most better, $\geq 1$. This increased minimum value allows to better achieve the objectives of the invention.

According to the invention, the composition of the invention comprises cobalt (expressed in the form of Co) as follows: 0.05-5 ppm. Preferably, the composition comprises cobalt as follows: $Co \leq 4$ ppm or better $Co \leq 3.5$ ppm. In a very preferred embodiment, the composition comprises cobalt as follows: $Co \leq 3$ ppm. This last limitation is advantageous in order to limit luminous transmittance loss while still keeping neutrality.

According to an embodiment of the invention, the composition comprises total iron: 20-400 ppm and Co: 0.05-2 ppm. Preferably, the composition comprises total iron: 20-400 ppm and Co: 0.05-1.5 ppm.

According to another embodiment of the invention, the composition comprises total iron: 20-200 ppm and Co: 0.05-1.5 ppm. Preferably, the composition comprises total iron: 20-200 ppm and Co: 0.05-1 ppm.

According to the invention, the composition of the invention comprises selenium (expressed in the form of Se) as follows: 0.1-<3 ppm.

Preferably, the composition comprises advantageously: $Se \leq 2.5$ ppm or better: $Se \leq 2$ ppm. This decreased maximum value allows to decrease costs but also to limit the luminous transmittance loss, while still keeping neutrality.

Preferably also, the composition comprises: $Se \geq 0.2$ ppm and more preferably, $Se \geq 0.3$ ppm. This increased minimum value allows better approaching neutrality.

In a very preferred embodiment, the composition comprises: Se 0.2-2.5 ppm or better, 0.2-2 ppm.

According to an embodiment of the invention, the composition comprises $Er_2O_3 \geq 10$ ppm. More preferably, the composition comprises $Er_2O_3 \geq 20$ ppm, or better $\geq 30$ ppm. This allows to better achieve the objectives of the invention.

According to another embodiment of the invention, the composition comprises $Er_2O_3 \leq 1000$ ppm. More preferably, the composition comprises $Er_2O_3 \leq 800$ ppm or better $\leq 600$ ppm. Very preferably, the composition comprises $Er_2O_3 \leq 500$ ppm. This allows to better control costs of the glass.

According to a specific mode of the invention, the composition comprises the following:

| | |
|---|---|
| Total iron (expressed as $Fe_2O_3$) | 20-400 ppm; |
| Selenium (expressed as Se) | 0.1-<3 ppm; |
| Cobalt (expressed as Co) | 0.05-2 ppm; and |
| a ratio $Er_2O_3/Fe_2O_3$ | 0.1-1.25. |

According to another specific mode of the invention, the composition comprises the following:

| | |
|---|---|
| Total iron (expressed as $Fe_2O_3$) | 20-200 ppm; |
| Selenium (expressed as Se) | 0.1-<3 ppm; |
| Cobalt (expressed as Co) | 0.05-1.5 ppm; and |
| a ratio $Er_2O_3/Fe_2O_3$ | 0.1-1.25. |

The glass sheet according to the invention is made of glass which may belong to various categories. The glass can thus be a glass of soda-lime-silica, aluminosilicate or borosilicate type, and the like. Preferably, the composition of the glass sheet comprises a base glass matrix with a composition comprising the following in weight percentage, expressed with respect to the total weight of glass:

| | |
|---|---|
| $SiO_2$ | 40-78% |
| $Al_2O_3$ | 0-18% |
| $B_2O_3$ | 0-18% |
| $Na_2O$ | 0-20% |
| CaO | 0-15% |
| MgO | 0-10% |
| $K_2O$ | 0-10% |
| BaO | 0-5%. |

More preferably, notably for low production costs reasons, the glass composition is a soda-lime-silicate-type glass. According to this embodiment, by "soda-lime-silicate-type glass", it is meant that the base glass matrix of the composition comprises the following in weight percentage, expressed with respect to the total weight of glass:

| | |
|---|---|
| $SiO_2$ | 60-78 wt % |
| $Al_2O_3$ | 0-8 wt % |
| $B_2O_3$ | 0-4 wt % |
| CaO | 0-15 wt % |
| MgO | 0-10 wt % |
| $Na_2O$ | 5-20 wt % |
| $K_2O$ | 0-10 wt % |
| BaO | 0-5 wt %. |

According to this embodiment, preferably, the base glass matrix of the composition comprises the following in weight percentage, expressed with respect to the total weight of glass:

| | |
|---|---|
| $SiO_2$ | 60-78 wt % |
| $Al_2O_3$ | 0-6 wt % |
| $B_2O_3$ | 0-1 wt % |
| CaO | 5-15 wt % |
| MgO | 0-8 wt % |
| $Na_2O$ | 10-20 wt % |
| $K_2O$ | 0-10 wt % |
| BaO | 0-1 wt %. |

In a preferred embodiment of the invention, the composition comprises the following in weight percentage, expressed with respect to the total weight of glass:

$65 \leq SiO_2 \leq 78$ wt %
$5 \leq Na_2O \leq 20$ wt %
$0 \leq K_2O < 5$ wt %
$1 \leq Al_2O_3 < 6$ wt %
$0 \leq CaO < 4.5$ wt %
$4 \leq MgO \leq 12$ wt %
$(MgO/(MgO+CaO)) \geq 0.5$.

In another preferred embodiment of the invention, the composition comprises the following in weight percentage, expressed with respect to the total weight of glass:

$65 \leq SiO_2 \leq 78\%$
$5 \leq Na_2O \leq 20\%$
$0 \leq K_2O < 5\%$
$3 < Al_2O_3 \leq 5\%$
$0 < CaO < 4.5\%$
$4 \leq MgO \leq 12\%$;
$0.88 \leq [MgO/(MgO+CaO)] < 1$.

In another preferred embodiment of the invention, the composition comprises the following in weight percentage, expressed with respect to the total weight of glass:

$60 \leq SiO_2 \leq 78\%$
$5 \leq Na_2O \leq 20\%$
$0.9 < K_2O \leq 12\%$
$4.9 \leq Al_2O_3 \leq 8\%$
$0.4 < CaO < 2\%$
$4 < MgO \leq 12\%$ In another preferred embodiment of the invention, the composition comprises the following in weight percentage, expressed with respect to the total weight of glass:

$65 \leq SiO_2 \leq 78$ wt %
$5 \leq Na_2O \leq 20$ wt %
$1 \leq K_2O < 8$ wt %
$1 \leq Al_2O_3 < 6$ wt %
$2 \leq CaO < 10$ wt %
$0 \leq MgO \leq 8$ wt %
$K_2O/(K_2O+Na_2O): 0.1-0.7$.

In particular, examples of base glass matrixes for the composition according to the invention are described in published PCT patent applications WO2015/150207A1, WO2015/150403A1, WO2016/091672 and WO2016/169823, and in filed EP patent application n°16176447.7.

Most of classical extra-clear to clear soda-lime-silicate-type glass compositions does not comprise significant amount of other colorants than iron, as impurities. Nevertheless, some specific compositions may comprise some other colorants as impurities due mainly to particular contaminated raw materials. For example, some compositions may comprise nickel (i.e. up to 0.002 wt %) or chromium (i.e. up to 0.005 wt %) as an impurity.

Advantageously, the glass sheet of the invention may be tempered, mechanically or chemically. It may also be bended/curved, or in a general manner, deformed to reach any desired configuration (by cold-bending, thermoforming). It may also be laminated.

According to one embodiment of the invention, the glass sheet is coated with at least one transparent and electrically conducting thin layer. A transparent and conducting thin layer according to the invention can, for example, be a layer based on $SnO_2$:F, $SnO_2$:Sb or ITO (indium tin oxide), ZnO:Al or also ZnO:Ga.

According to another advantageous embodiment of the invention, the glass sheet is coated with at least one antireflection layer. This embodiment is obviously advantageous in the case of use of the glass sheet of the invention as front face of a screen. An antireflection layer according to the invention can, for example, be a layer based on porous silica having a low refractive index or it can be composed of several layers (stack), in particular a stack of layers of dielectric material alternating layers having low and high refractive indexes and terminating in a layer having a low refractive index.

According to another embodiment, the glass sheet is coated with at least one anti-fingerprint layer or has been treated so as to reduce or prevent fingerprints from registering. This embodiment is also advantageous in the case of use of the glass sheet of the invention as front face of a touchscreen. Such a layer or such a treatment can be combined with a transparent and electrically conducting thin layer deposited on the opposite face. Such a layer can be combined with an antireflection layer deposited on the same face, the anti-fingerprint layer being on the outside of the stack and thus covering the antireflection layer.

According to still another embodiment, the glass sheet is coated with at least one layer or has been treated so as to reduce or prevent glaring and/or sparkling. This embodiment is of course advantageous in the case of use of the glass sheet of the invention as front face of a display device. Such an anti-glare or anti-sparkling treatment is for example an acid-etching producing a specific roughness of the treated face of the glass sheet.

According to still another embodiment, the glass sheet has been treated so as to gain antibacterial properties (i.e. through a known silver treatment). Such a treatment is also advantageous in the case of use of the glass sheet of the invention as front face of a display device.

According to still another embodiment, the glass sheet is coated with at least one paint layer including enamel, organic paint, lacquer, . . . This paint layer may advantageously be colored or white. According to this embodiment, the glass sheet may be coated on at least one face in its entire surface or only partially.

According to the applications and/or properties desired, other layer(s)/treatment(s) can be deposited/done on one and/or the other face of the glass sheet according to the invention.

The glass sheet of the invention is of particular interest if integrated in/associated with/used as objects as diversified as: furniture (tables, shelves, chairs, doors, . . . ), electronic devices, appliances, white boards, credencies, shower doors, wall panels, facades, interior partitions, lighting, . . . The glass sheet of the invention may also be used in other fields like automotive or display.

Embodiments of the invention will now be further described, by way of examples only, together with some comparative examples, not in accordance with the invention.

The following examples are provided for illustrative purposes, and are not intended to limit the scope of this invention.

EXAMPLES

Different glass sheets according to the invention were calculated/simulated, with variable amounts of total iron, selenium, erbium and cobalt, as 3 sets of examples (Sets 1 to 3).

The simulations of luminous transmittance and color parameters of each glass sheet from Sets 1-3 were based on the absorption spectrum of each colorant (cobalt, selenium, erbium) in the glass. Each absorption spectrum was derived from spectral transmission measurements, and are also described in the literature. Based on the amount of colorants (cobalt, selenium, erbium) in the glass, one can then compute the resultant absorption spectrum by computed a weighted sum of individual colorant absorptions. Finally, from this resultant absorption spectrum, it was possible to compute the luminous transmittance and the color parameters of each example for a given optical length (4 mm or 500 mm).

The following optical and color properties were computed for glass sheets from Sets 1-3:

The luminous transmittance TLD4 was determined for a thickness of 4 mm with a solid viewing angle of 2° (D65 illuminant) and for a wavelength range between 380 and 780 nm;

The CIE L* a* b* parameters were determined in transmission with the following parameters: Illuminant D65, 10°, at 4 mm and 500 mm thicknesses;

The half absorption length (HAL, in mm) was determined by evaluating the optical path length in order to reach a TLD value equal to 50% of TLD that would be obtained for a glass with thickness approaching 0 mm (or equivalently for a glass with no absorption).

The N value at 4 mm or 500 mm was finally calculated from the formula:

$$N=\sqrt{a^{*2}+b^{*2}}.$$

Set1

EX1.1 example (comparative) corresponds to a classical and commercialized clear glass sheet (sold as "clearlite®", with 600 ppm total iron), without cobalt, erbium or selenium.

EX1.2 example (comparative) corresponds to a glass sheet with a composition comprising an amount of total iron similar to that of a classical clear glass of the state-of-the-art, in which some cobalt and selenium are present.

EX1.3 example (comparative) correspond to a glass sheet with a composition comprising an amount of total iron similar to that of a classical clear glass of the state-of-the-art, in which some erbium is present.

EX1.4 example (comparative) corresponds to glass sheet, comprising an amount of total iron similar to that of a classical clear glass of the state-of-the-art and in which cobalt, erbium and selenium are present not according to the invention.

EX1.5-EX1.10 examples correspond to glass sheets according to the invention, comprising an amount of total iron similar to that of a classical clear glass of the state-of-the-art and in which cobalt, erbium and selenium are present according to the invention.

Table 1 shows the computed optical and color properties for examples EX1.1 to 1.10 from Set1, and their respective amounts of total iron, cobalt, selenium and erbium.

TABLE 1

| | EX | | | | | | | | | |
|---|---|---|---|---|---|---|---|---|---|---|
| | 1.1 | 1.2 | 1.3 | 1.4 | 1.5 | 1.6 | 1.7 | 1.8 | 1.9 | 1.10 |
| | | comparative | | | | | invention | | | |
| $Fe_2O_3$ (ppm) | 600 | 600 | 600 | 600 | 600 | 600 | 600 | 600 | 600 | 600 |
| Co (ppm) | 0 | 2.83 | 0 | 2.73 | 2.50 | 2.17 | 1.86 | 1.54 | 1.42 | 0.59 |
| Se (ppm) | 0 | 1.95 | 0 | 1.88 | 1.71 | 1.49 | 1.29 | 1.08 | 1.00 | 0.52 |
| $Er_2O_3$ (ppm) | 0 | 0 | 1026 | 30 | 100 | 203 | 300 | 400 | 440 | 700 |
| $Er_2O_3/Fe_2O_3$ | 0 | 0 | 1.71 | 0.05 | 0.17 | 0.34 | 0.50 | 0.66 | 0.73 | 1.17 |
| TLD4 (%) | 90.7 | 88.3 | 90.2 | 88.3 | 88.5 | 88.7 | 88.9 | 89.1 | 89.2 | 89.7 |
| a* 4 mm | −0.62 | 0.035 | 0.035 | 0.035 | 0.035 | 0.035 | 0.035 | 0.035 | 0.035 | 0.035 |
| b* 4 mm | 0.298 | 0.081 | 0.003 | 0.081 | 0.081 | 0.082 | 0.082 | 0.082 | 0.082 | 0.082 |
| $N_{4\,mm}$ | 0.68 | 0.09 | 0.03 | 0.088 | 0.088 | 0.088 | 0.089 | 0.089 | 0.089 | 0.089 |
| a* 500 mm | −42.5 | 0.19 | −18.3 | 0.139 | −0.084 | −0.635 | −1.41 | −2.51 | −3.03 | −7.93 |
| b* 500 mm | 17.4 | 1.27 | 7.21 | 1.41 | 1.79 | 2.45 | 3.22 | 4.10 | 4.47 | 7.48 |
| $N_{500\,mm}$ | 45.5 | 1.29 | 19.7 | 1.42 | 1.79 | 2.53 | 3.51 | 4.81 | 5.40 | 10.9 |
| HAL (mm) | 238 | 71 | 181 | 72 | 75 | 80 | 87 | 94 | 97 | 126 |

Results for EX1.1 to 1.10 show that:

EX1.1 (Clear glass without Se, Co or Er) has non-neutral edges ($N_{500mm}$ is very far from 0, edges visually appear greenish) but shows a very high edge luminosity (high value for HAL meaning that edges are visually very bright);

EX1.2 (clear glass with Se, Co) shows very good sheet neutrality ($N_{4mm}$ value is very close to 0) and edge neutrality ($N_{500mm}$ is as well very low). However, it shows a significant loss in TLD4 (−1.4%) and a HAL value very low compared to clear glass EX1.1, meaning that its edge luminosity is very low and thus, edge appearance for a sheet with 500 mm-length is dark/dusky (visually grey-coloured);

EX1.3 (clear glass with Er) has a TLD4 value which is almost maintained to the value of clear glass EX1.1 and a HAL value which is quite high compared to EX1.2 and approaching that of EX1.1, meaning that its edge luminosity is satisfying. However, even if EX1.3 shows a very good sheet neutrality ($N_{4mm}$ value is very close to 0), its edge neutrality is very poor ($N_{500mm}$ is high, edges appear yellow/green-colored);

EX1.5-1.10 (clear glass with Co, Se, Er according to the invention) allow achieving the goal of the invention in a clear glass matrix, namely reaching very neutral/achromatic edges ($N_{500}$, is low to very low depending on the amounts of each Se, Co, $Er_2O_3$), together with a higher edge luminosity (HAL) than EX1.2, while keeping TLD4 at a very good level (slightly reduced compared to classical clear glass EX1.1 but increased by 0.3% to 1.4% compared with EX1.2).

Set2

EX2.1 example (comparative) corresponds to a classical low-iron glass sheet (with ~260 ppm total iron) without cobalt, erbium or selenium.

EX2.2 example (comparative) corresponds to a glass sheet with a composition comprising an amount of total iron similar to that of EX2.1, in which some cobalt and selenium are present.

EX2.3 example (comparative) corresponds to a glass sheet with a composition comprising an amount of total iron similar to that of EX2.1, in which some erbium is present.

EX2.4-EX2.7 examples correspond to glass sheets according to the invention, comprising an amount of total iron similar to that of a classical low-iron glass of the state-of-the-art (EX2.1) and in which cobalt, erbium and selenium are present according to the invention.

Table 2 shows the computed optical and color properties for examples EX2.1 to 2.7 from Set2, and their respective amounts of total iron, cobalt, selenium and erbium.

EX2.2 (with Se, Co) shows very good sheet neutrality ($N_{4mm}$ value is very close to 0) and edge neutrality ($N_{500mm}$ is as well very low). However, it shows a significant loss in TLD4 (−1%) a HAL value very low compared to EX1.1, meaning that its edge luminosity is very low and thus, edge appearance for a sheet with 500 mm-length is dark/dusky (visually grey-coloured);

EX2.3 (with Er) has a TLD4 value which is better than EX2.2 and a HAL value which is quite high compared to EX2.2 and approaching that of EX2.1, meaning that its edge luminosity is satisfying. However, even if EX2.3 shows a very good sheet neutrality ($N_{4mm}$ value is very close to 0), its edge neutrality is very poor ($N_{500mm}$ is high, edges being yellow/green-colored);

EX2.4-2.7 (with Co, Se, Er according to the invention) allow achieving the goal of the invention in a low-iron glass matrix with 260 ppm total iron, namely reaching very neutral/achromatic edges ($N_{500mm}$ is low to very low depending on the amounts of each Se, Co, $Er_2O_3$), together with a higher edge luminosity (HAL) than EX2.2, while keeping TLD4 at a very good level (slightly reduced compared to classical clear glass EX1.1 but same or increased by 0.2% to 0.6% compared with EX2.2).

Set3

EX3.1 example (comparative) corresponds to a classical low-iron glass sheet (with ~120 ppm total iron) without cobalt, erbium or selenium.

EX3.2 example (comparative) corresponds to a glass sheet with a composition comprising an amount of total iron similar to that of EX3.1, in which some cobalt and selenium are present.

EX3.3 example (comparative) corresponds to a glass sheet with a composition comprising an amount of total iron similar to that of EX3.1, in which some cobalt and erbium are present.

EX3.4-EX3.6 examples correspond to glass sheets according to the invention, comprising an amount of total iron similar to that of a classical low-iron glass of the

TABLE 2

| | EX | | | | | | |
|---|---|---|---|---|---|---|---|
| | 2.1 | 2.2 | 2.3 | 2.4 | 2.5 | 2.6 | 2.7 |
| | comparative | | | invention | | | |
| $Fe_2O_3$ (ppm) | 260 | 260 | 260 | 260 | 260 | 260 | 260 |
| Co (ppm) | 0 | 1.22 | 0 | 1.12 | 0.9 | 0.58 | 0.26 |
| Se (ppm) | 0 | 1.40 | 0 | 1.29 | 1.04 | 0.71 | 0.39 |
| $Er_2O_3$ (ppm) | 0 | 0 | 440 | 30 | 100 | 200 | 300 |
| $Er_2O_3/Fe_2O_3$ | 0 | 0 | 1.69 | 0.12 | 0.38 | 0.77 | 1.15 |
| TLD4 (%) | 91.3 | 90.3 | 91.1 | 90.3 | 90.5 | 90.7 | 90.9 |
| a* 4 mm | −0.249 | 0.035 | 0.035 | 0.035 | 0.035 | 0.035 | 0035 |
| b* 4 mm | 0.176 | 0.082 | 0.047 | 0.082 | 0.082 | 0.082 | 0.082 |
| $N_{4\,mm}$ | 0.305 | 0.089 | 0.059 | 0.089 | 0.089 | 0.089 | 0.089 |
| a* 500 mm | −26.22 | 0.24 | −9.60 | 0.16 | −0.39 | −1.96 | −4.53 |
| b* 500 mm | 9.98 | 0.71 | 2.67 | 0.85 | 1.34 | 2.30 | 3.61 |
| $N_{500\,mm}$ | 28.06 | 0.75 | 9.96 | 0.86 | 1.40 | 3.02 | 5.80 |
| HAL (mm) | 545 | 164 | 419 | 171 | 190 | 229 | 291 |

Results for EX2.1 to 2.7 show that:

EX2.1 (without Se, Co or Er) has non-neutral edges ($N_{500mm}$ has a very high values, edges visually appear yellow-green) but shows a very high edge luminosity (high value for HAL meaning that edges are visually very bright);

state-of-the-art (EX3.1) and in which cobalt, erbium and selenium are present according to the invention.

Table 3 shows the computed optical and color properties for examples EX3.1 to 3.6 from Set3, and their respective amounts of total iron, cobalt, selenium and erbium.

TABLE 3

| | EX | | | | | |
|---|---|---|---|---|---|---|
| | 3.1 | 3.2 comparative | 3.3 | 3.4 | 3.5 invention | 3.6 |
| $Fe_2O_3$ (ppm) | 120 | 120 | 120 | 120 | 120 | 120 |
| Co (ppm) | 0 | 0.56 | 0 | 0.46 | 0.24 | 0.08 |
| Se (ppm) | 0 | 1.05 | 0 | 0.88 | 0.49 | 0.24 |
| $Er_2O_3$ (ppm) | 0 | 0 | 203 | 30 | 100 | 150 |
| $Er_2O_3/Fe_2O_3$ | 0 | 0 | 1.69 | 0.25 | 0.83 | 1.25 |
| TLD4 (%) | 91.6 | 91.1 | 91.5 | 91.2 | 91.3 | 91.4 |
| a* 4 mm | −0.10 | 0.04 | 0.07 | 0.04 | 0.03 | 0.04 |
| b* 4 mm | 0.13 | 0.08 | 0.07 | 0.08 | 0.08 | 0.08 |
| $N_{4\,mm}$ | 0.16 | 0.09 | 0.07 | 0.09 | 0.09 | 0.09 |
| a* 500 mm | −14.22 | 0.09 | −3.43 | −0.85 | −0.85 | −1.88 |
| b* 500 mm | 5.13 | 0.33 | 0.31 | 0.85 | 0.85 | 1.43 |
| $N_{500\,mm}$ | 15.11 | 0.35 | 3.44 | 0.44 | 1.20 | 2.36 |
| HAL (mm) | 1188 | 356 | 908 | 391 | 515 | 680 |

Results for EX3.1 to 3.6 show that:

EX3.1 (without Se, Co or Er) has non-neutral edges ($N_{500mm}$ has a very high values, edges visually appear yellow-green) but shows a very high edge luminosity (very high value for HAL meaning that edges are visually very bright);

EX3.2 (with Se, Co) shows very good sheet neutrality ($N_{4mm}$ value is very close to 0) and edge neutrality ($N_{500mm}$ is as well very low). However, it shows a significant loss in TLD4 (−0.5%) a HAL value low compared to EX3.1, meaning that its edge luminosity is low and thus, edge appearance for a sheet with 500 mm-length is dark/dusky (visually grey-coloured);

EX3.3 (with Er) has a TLD4 value which is better than EX3.2 and a HAL value which is quite high compared to EX3.2 and approaching that of EX3.1, meaning that its edge luminosity is very satisfying. However, even if EX3.3 shows a very good sheet neutrality ($N_{4mm}$ value is very close to 0), its edge neutrality is poor ($N_{500mm}$ is high, edges being yellow-colored);

EX3.4-3.6 (with Co, Se, Er according to the invention) allow achieving the goal of the invention in a low-iron glass matrix with 120 ppm total iron, namely reaching very neutral/achromatic edges ($N_{500mm}$ is low to very low depending on the amounts of each Se, Co, $Er_2O_3$), together with a higher edge luminosity (HAL) than EX3.2, while keeping TLD4 at a very good level (slightly reduced compared to EX3.1 but increased by 0.1% to 0.3% compared with EX3.2).

Set4

Next to computed examples, various glass sheets according to the invention were prepared in lab with variable amounts of iron, selenium, cobalt and erbium, in a classical soda-lime base glass matrix.

For the preparation of the samples from Set 4, the starting materials were mixed in the powder form and placed in a crucible for the melting, according to classical a pre-defined soda-lime silica base glass matrix to which were added starting materials comprising selenium and/or cobalt and/or erbium in variable amounts as a function of the contents targeted in the final composition (it should be noted that the iron is already, at least in part, present in the starting materials of the base composition as impurity). The $SiO_2$ amount in glass samples was adapted depending on the amounts of total iron, cobalt, selenium and erbium in order to reach 100% in weight total.

| The following base glass matrix was used: | |
|---|---|
| Component | [weight %] |
| CaO | 7.80 |
| $K_2O$ | 0.015 |
| $Na_2O$ | 13.68 |
| $TiO_2$ | 0.02 |
| $Al_2O_3$ | 1.36 |
| MgO | 4.44 |
| $SO_3$ | 0.42 |
| $SiO_2$ | amount to reach 100% |

EX4.1 example (comparative) corresponds to a classical low-iron glass sheet (with ~120 ppm total iron) without cobalt, erbium or selenium.

EX4.2 example (comparative) corresponds to a glass sheet with a composition comprising an amount of total iron similar to that of EX4.1, in which some cobalt and selenium are present.

EX4.3-4.4 example (comparative) correspond to a glass sheets with a composition comprising an amount of total iron similar to that of EX4.1, in which some erbium is present.

EX4.5 example corresponds to a glass sheet according to the invention, comprising an amount of total iron similar to that of a classical low-iron glass of the state-of-the-art (EX4.1) and in which cobalt, erbium and selenium are present according to the invention.

The optical properties of each glass sheet from Set4, were determined on a Perkin Elmer Lambda 950 spectrophotometer equipped with an integrating sphere with a diameter of 150 mm, and in particular:

the light transmission TLD4 was determined for a thickness of 4 mm with a solid viewing angle of 2° (D65 illuminant) and for a wavelength range between 380 and 780 nm; also determined at a solid angle of observation of 2° (illuminant D65);

the CIE L*a*b* parameters were determined in transmission with the following measurement parameters: illuminant D65, 10°, at 4 mm and 500 mm thicknesses;

The half absorption length (HAL, in mm) was determined by evaluating the optical path length in order to reach a TLD value equal to 50% of TLD that would be obtained for a glass with thickness approaching 0 mm (or equivalently for a glass with no absorption).

Compositions and optical properties measured for glass sheets from Set4 are shown in Table 4.

TABLE 4

| | EX | | | | |
|---|---|---|---|---|---|
| | 4.1 | 4.2 comparative | 4.3 | 4.4 | 4.5 invention |
| $Fe_2O_3$ (ppm) | 122 | 126 | 121 | 96 | 128 |
| Co (ppm) | 0 | 0.55 | 0 | 0 | 0.65 |
| Se (ppm) | 0 | 1.1 | 0 | 0 | 0.6 |

TABLE 4-continued

| | EX | | | | |
|---|---|---|---|---|---|
| | 4.1 | 4.2 comparative | 4.3 | 4.4 | 4.5 invention |
| $Er_2O_3$ (ppm) | 0 | 0 | 300 | 120 | 85 |
| $Er_2O_3/Fe_2O_3$ | 0 | 0 | 2.48 | 1.25 | 0.66 |
| TLD4 (%) | 91.52 | 90.92 | 91.35 | 91.34 | 91.25 |
| a* 4 mm | −0.15 | −0.02 | −0.01 | −0.09 | −0.04 |
| b* 4 mm | 0.23 | 0.08 | 0.16 | 0.08 | 0.08 |
| $N_{4\,mm}$ | 0.27 | 0.08 | 0.16 | 0.12 | 0.09 |
| a* 500 mm | −20.05 | −4.31 | −9.66 | −12.47 | −7.69 |
| b* 500 mm | 14.98 | −0.48 | 10.12 | 0.22 | −0.50 |
| $N_{500\,mm}$ | 25.03 | 4.34 | 13.99 | 12.47 | 7.29 |
| HAL (mm) | 1761 | 341 | 809 | 784 | 614 |

Set5

Some soda-lime silica glass sheets according to the invention were produced industrially, in a classical and known manner on a mass production float furnace, with variable amounts of iron, selenium, cobalt and erbium in a classical soda-lime base glass matrix.

EX5.1 example (comparative) corresponds to a classical low-iron glass sheet (with ~200 ppm total iron) without cobalt, erbium or selenium.

EX5.2 example corresponds a to glass sheet according to the invention, comprising an amount of total iron similar to that of a classical low-iron glass of the state-of-the-art (EX5.1) and in which cobalt, erbium and selenium are present according to the invention.

Compositions and optical properties measured for glass sheets from Set5 are shown in Table 5.

TABLE 5

| | EX | |
|---|---|---|
| | 5.1 comparative | 5.2 invention |
| $Fe_2O_3$ (ppm) | 202 | 190 |
| Co (ppm) | 0 | 1.2 |
| Se (ppm) | 0 | 0.5 |
| $Er_2O_3$ (ppm) | 0 | 80 |
| $Er_2O_3/Fe_2O_3$ | 0 | 0.42 |
| TLD4 (%) | 91.4 | 89.95 |
| a* 4 mm | −0.26 | 0.01 |
| b* 4 mm | 0.13 | 0.09 |
| $N_{4\,mm}$ | 0.29 | 0.09 |
| a* 500 mm | −29.78 | −1.49 |
| b* 500 mm | 6.01 | 1.04 |
| $N_{500\,mm}$ | 30.38 | 1.82 |
| HAL (mm) | 962 | 147 |

The invention claimed is:

1. A glass sheet having a composition comprising the following:

| | |
|---|---|
| Total iron (expressed as $Fe_2O_3$) | 20-750 ppm; |
| Selenium (expressed as Se) | 0.1-<3 ppm; |
| Cobalt (expressed as Co) | 0.05-5 ppm; and |
| a ratio $Er_2O_3/Fe_2O_3$ | 0.1-1.5. |

2. The glass sheet according to claim 1, wherein the composition comprises: a ratio $Er_2O_3/Fe_2O_3 \leq 1.3$.

3. The glass sheet according to claim 1 wherein the composition comprises: a ratio $Er_2O_3/Fe_2O_3 \geq 0.2$.

4. The glass sheet according to claim 1 wherein the composition comprises: $Se \leq 2.5$ ppm.

5. The glass sheet according to claim 4, wherein the composition comprises: $Se \leq 2$ ppm.

6. The glass sheet according to claim 1 wherein the composition comprises: $Er_2O_3 \geq 10$ ppm.

7. The glass sheet according to claim 6, wherein the composition comprises: $Er_2O_3 \geq 20$ ppm.

8. The glass sheet according to claim 7, wherein the composition comprises: $Er_2O_3 \leq 800$ ppm.

9. The glass sheet according to claim 1, wherein the composition comprises: total iron 20-600 ppm.

10. The glass sheet according to claim 9, wherein the composition comprises: total iron 20-400 ppm.

11. The glass sheet according to claim 10, wherein the composition comprises: Co 0.05-2 ppm.

12. The glass sheet according to claim 1 wherein the composition comprises: total iron 20-200 ppm.

13. The glass sheet according to claim 12, wherein the composition comprises: Co 0.05-1.5 ppm.

14. The glass sheet according to claim 1, wherein the glass sheet has a $N_{500mm} \leq 15$.

15. The glass sheet according to claim 1, wherein the glass sheet has a $TLD4 \geq 87\%$.

16. The glass sheet according to claim 1, wherein the glass sheet has a $N_{500mm} \leq 12$.

17. A glass sheet having a composition comprising the following:

| | |
|---|---|
| Total iron (expressed as $Fe_2O_3$) | 20-400 ppm; |
| Selenium (expressed as Se) | 0.1-<3 ppm; |
| Cobalt (expressed as Co) | 0.05-5 ppm; and |
| a ratio $Er_2O_3/Fe_2O_3$ | 0.1-1.5, | wherein the glass sheet has a $TLD4 \geq 87\%$,
wherein the glass sheet has a $N_{500\,mm} \leq 15$, and
wherein the glass sheet has a half edge absorption length (HAL) of $\geq 171$ mm.

18. A glass sheet having a composition comprising the following:

| | |
|---|---|
| $SiO_2$ | 60-78 wt % |
| $Al_2O_3$ | 0-8 wt % |
| $B_2O_3$ | 0-4 wt % |
| CaO | 0-15 wt % |
| MgO | 0-10 wt % |
| $Na_2O$ | 5-20 wt % |
| K2O | 0-10 wt % |
| BaO | 0-5 wt % |
| Total iron (expressed as $Fe_2O_3$) | 20-200 ppm; |
| Selenium (expressed as Se) | 0.1-<3 ppm; |
| Cobalt (expressed as Co) | 0.05-2 ppm; and |
| a ratio $Er_2O_3/Fe_2O_3$ | 0.2-12.5. | wherein the glass sheet has a TLD4≥88%,
wherein the glass sheet has a $N_{500mm} \leq 8$,
wherein the glass sheet has a half edge absorption length (HAL) of ≥391 mm, and
wherein the glass sheet contains no other colorants other than impurities in the glass.

19. The glass sheet according to claim 1, wherein the composition comprises: Co 2 pm-5 ppm.

20. The glass sheet according to claim 1, comprising total iron (expressed as $Fe_2O_3$) 400-750 ppm, and
wherein the glass sheet has a half edge absorption length (HAL) of ≥75 mm.

* * * * *